US011757712B1

(12) United States Patent
Thanabalan

(10) Patent No.: US 11,757,712 B1
(45) Date of Patent: Sep. 12, 2023

(54) AUTO DISCOVERY AND CONFIGURATION OF DATA CENTER COMPONENTS

(71) Applicant: Hewlett Packard Enterprise Development LP, Spring, TX (US)

(72) Inventor: Ramakrishnan Thanabalan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/057,196

(22) Filed: Nov. 18, 2022

(51) Int. Cl.
*G06F 15/173* (2006.01)
*H04L 41/0806* (2022.01)
*H04L 61/10* (2022.01)

(52) U.S. Cl.
CPC .......... *H04L 41/0806* (2013.01); *H04L 61/10* (2013.01)

(58) Field of Classification Search
CPC ............................ H04L 41/0806; H04L 61/10
See application file for complete search history.

(56) References Cited

U.S. PATENT DOCUMENTS

2022/0114055 A1* 4/2022 Doshi ................. G06F 11/1428
2023/0009197 A1* 1/2023 Seneger ............ G06Q 30/0241

* cited by examiner

*Primary Examiner* — Thanh T Nguyen
(74) *Attorney, Agent, or Firm* — Mauriel Kapouytian Woods LLP

(57) ABSTRACT

Techniques are provided for configuring management IP addresses to network devices in a data center that have management capabilities. Based on a received request to configure a managed network device in a network, a first connection is established between a management station and a managed switch to which the managed network device is connected. A network identifier of the managed network device is retrieved from the managed switch using the established first connection. Using the retrieved network identifier, a link-local address of the managed network device is derived. A second connection is established between the management station and the managed network device based on the derived link-local address. The management IP addresses of the managed network device are configured using the second connection.

20 Claims, 5 Drawing Sheets

AUTO DISCOVERY AND CONFIGURATION OF DATA CENTER COMPONENTS

BACKGROUND

Components of a data center can include various kinds of devices such as hosts, routers, switches, servers, firewalls, controllers, storage devices, etc. These components often have multiple internet protocol (IP) addresses. For example, a switch may have at least one IP address for each interface or each network interface controller (NIC). A web server may have different IP addresses for different websites. These IP addresses often change at runtime due to network or system reconfiguration.

BRIEF DESCRIPTION OF THE DRAWINGS

Various objects, features, aspects and advantages of the inventive subject matter will become more apparent from the following specification, along with the accompanying drawings in which like numerals represent like components.

Figure 1:
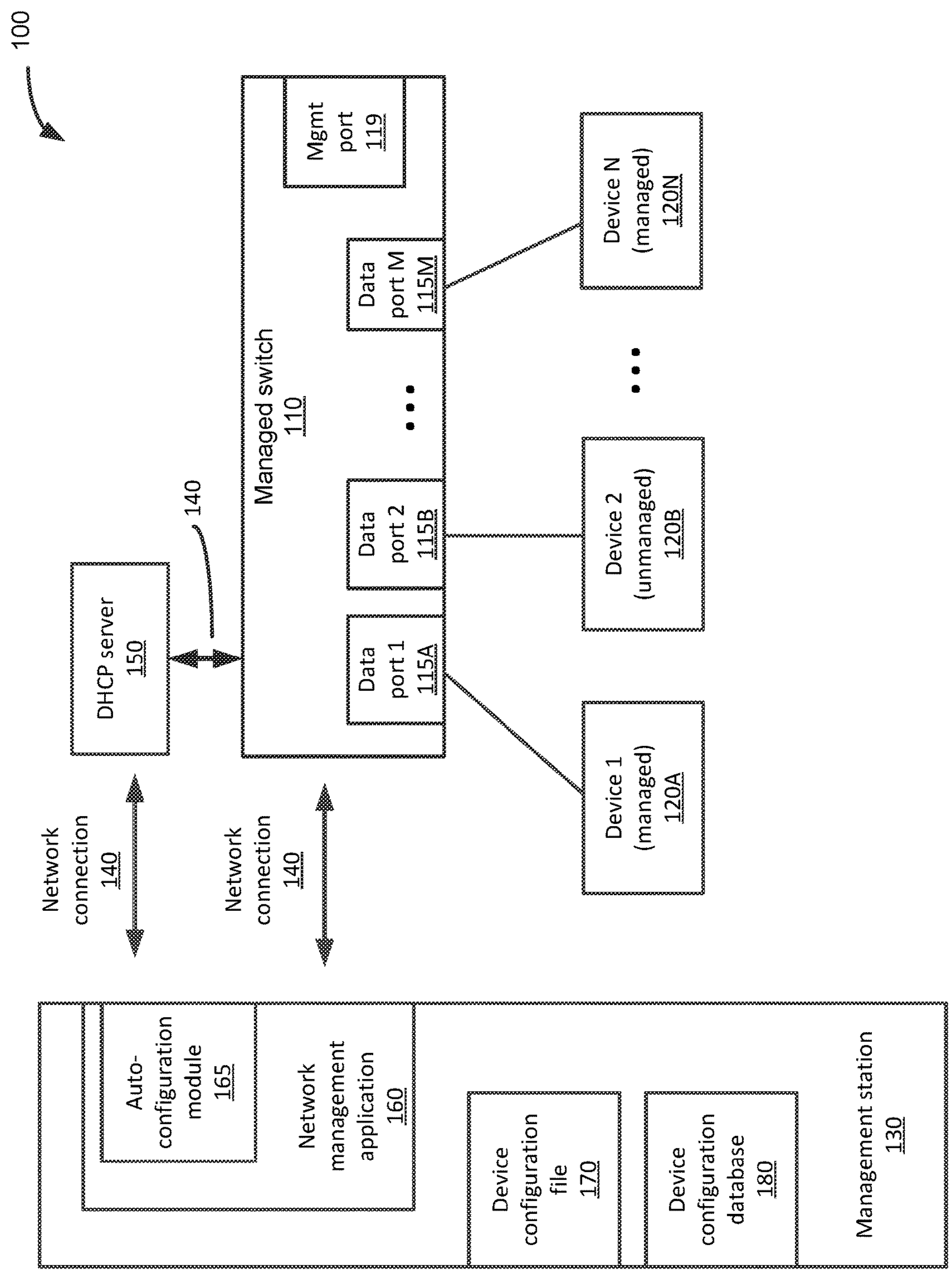
FIG. 1 illustrates a management station capable of configuring network devices in a network environment in accordance with an example.

While the examples are described with reference to the above drawings, the drawings are intended to be illustrative, and other examples are consistent with the spirit, and within the scope, of the various examples herein.

DETAILED DESCRIPTION

In a network (e.g., data center) environment, a network administrator can manage various network components, such as network switches and network devices connected to the switches, via at least one corresponding management IP address. These dedicated management IP addresses are separate from other device IP addresses used, e.g., for data communication, and are intended to allow for the network administrator to maintain a robust connection to a network device. For example, management IP addresses can allow a network administrator to manage corresponding network components even when there is data traffic congestion or when the network switch connected to the device malfunctions. To achieve this robustness, management IP addresses are typically configured as a static IP address, rather than as a dynamic IP address allocated at run time, e.g., by a Dynamic Host Configuration Protocol (DHCP) server. Static IP addresses may offer greater stability and consistent connectivity to devices than dynamic IP addresses. But a network administrator first needs to connect to a network device for it to be configured with a static management IP address.

With hundreds or thousands of network devices in a data center environment needing to be set up, the task of configuring each network device with at least one management IP address can be time-consuming. Further, these methods are often inconvenient and subject to human errors, as they typically involve having the network administrator perform various manual set up procedures.

Thus, the techniques disclosed herein for automatically configuring management IP addresses for network devices, without having to resort to error-prone and tedious manual configuration procedures, are clearly advantageous for network management. The disclosed techniques provide for automatically connecting and configuring network devices, e.g., in a data center, prior to configuring the network devices with at least one management IP address. The disclosed techniques also may automatically discover and configure network devices within a network environment. As a result, the disclosed techniques greatly improve the efficiency and speed of configuring management IP addresses and/or other device parameters for device operation within a network environment.

According to an example, a request to configure at least one component in a network is received by a management station, where the network comprises at least a managed switch and a management station, and the at least one component is connected to the managed switch. The network may comprise a data center, and the at least one component may comprise at least one of a router, a switch, a hub, a bridge, a gateway, a repeater, a server, a firewall, a controller, or a virtual component. A first connection is established to the managed switch based on the request, and using the established first connection, a network identifier is retrieved for the at least one component from the managed switch. The network identifier for the at least one component may comprise at least one of a model name, a model number, a serial number, an address, or a software version number. A link-local address of the at least one component is derived based at least on the network identifier, and a second connection to the at least one component is established using the derived link-local address. Using the established second connection, at least one management IP address to the at least one component is configured, where the at least one management IP address is operable for addressing the at least one component within the network. The management IP address of the at least one component may be configured based on configuration data for the at least one component.

In some examples, at least one of the first connection or second connection may be established via a Secure Shell Protocol (SSH), and the managed switch may comprise an Out-of-Band Management (OOBM) switch.

In some examples, the network identifier may be a Media Access Control (MAC) address, and the link-local address of the at least one component may be derived by obtaining a MAC address for the at least one component from the managed switch, and translating the MAC address for the at least one component using a MAC address table. The network identifiers for each of the plurality of components may comprise the MAC address table, and the link-local address may be an IPv6 link-local address.

FIG. 1 illustrates a management station capable of configuring network devices in a network environment in accordance with an example. Network 100 may be, e.g., a data center, a public network, a private network, or any other type of network. Network 100 comprises managed switch 110, a plurality of connected network devices 120A-120N, management station 130, and DHCP server 150. Managed switch 110, management station 130, and DHCP server 150 are interconnected via network connections, conceptually illustrated as network connections 140 in FIG. 1.

Managed switch 110 comprises a plurality of data ports 1, 2, . . . , to M, corresponding to references 115A to 115M. Managed switch 110 may include management port 119 that is separate and apart from the data ports. Managed switch 110 may also include more than one management ports (additional management ports not shown in FIG. 1). The port type of the data or management ports 115A-115M or port 119 may be RJ45, or any other types of network interface. Data ports 115A-115M may also have other types of ports, such as SFP, SFP+, QSFP, etc., for different data speed.

Network devices 120A-120N are connected to managed switch 110 via its data ports 115A to 115M. Network devices can be either unmanaged or managed. In the example illustrated in FIG. 1, devices 120A and 120N are managed network devices, or simply, "managed devices". Device 120B is an unmanaged network device.

Management station 130 is a network device that monitors and controls other devices on the network. Management station 130 may include network management application 160, device configuration file 170, and device configuration database 180. Network management application 160 is an application configured to monitor and manage network 100 and network devices in the network. Device configuration file 170 and device configuration database 180 may be used to store predetermined configurations of managed devices in network 100 in a file format or in a database format, respectively.

Network management application 160 may include auto-configuration module 165, which is capable of configuring managed network devices using at least some of the steps disclosed in this disclosure (to be discussed in more detail later). Network management application 160 may also include other modules for managing a network (not shown in FIG. 1). For example, network management application 160 may include modules for monitoring network performance, modules for managing network security, modules for data logging and report, or modules for accounting management of network resources, etc.

Managed switch 110 is configured to have at least one IP address for management, also referred to as a management IP address. Using the management IP address for managed switch 110, management station 130 can connect to managed switch 110 to enable management communication. Management station 130 may manage switch 110 via interfaces such as command-line interface (CLI), Secure Shell Protocol (SSH), Simple Network Management Protocol (SNMP), or HTTP and HTTPS protocols, etc.

Management communication between management station 130 and managed switch 110 can be either in-band or out-of-band. An in-band management communication is communicated through connected data ports 115A to 115M of managed switch 110. For example, although not shown, management station 130 may be a part of or integrated into managed switch 110. An out-of-band communication is communicated through dedicated management port 119 (or additional managements ports not shown in FIG. 1) on managed switch 110. Managed switch 110 may be an Out-of-Band Management (OOBM) switch, which supports out-of-band management communication.

Network devices 120A-120N may include routers, other switches, hubs, bridges, gateways, repeaters, servers, firewalls, controllers, network storage devices, or virtual components, etc. A network device may be connected to a managed switch either directly or indirectly. As used herein, a direct connection refers to a physical connection, e.g., by a network cable, between the network device and the managed switch. An indirect connection, as used herein, refers to a logical connection between the network device and the managed switch that can include intervening network components (such as other switches, hubs, etc.) situated between the network device and the managed switch. In FIG. 1, network devices 120A-120N are either directly or indirectly connected to one of the data ports 115A-115M of managed switch 110. Unless expressed otherwise, when referring to a network device being "connected" to a switch in the disclosure herein, the connection can include direct and/or indirect connections.

An unmanaged network device has no configuration interface or options. It simply connects to other network devices or switches with a fixed configuration. For example, device 1208 may be an unmanaged network device. Unmanaged devices have IP addresses for data communication, but they do not have management IP addresses.

A managed network device allows users to manage, configure and monitor the operation of the device and other network devices connected to the device. In order for management station 130 to manage a managed device, the managed device is configured to have at least one management IP address. The management IP address of a managed device is different from the device's IP addresses for data communication. A managed device may have one or more separate management ports. A management port of a managed device may be connected to a different switch other than managed switch 110 (not shown in FIG. 1), so that management station 130 can still communicate with the device via out-of-band communication when managed switch 110 is down.

Management IP address of a managed device may be either dynamically allocated by DHCP server 150, or preconfigured with a static IP address. Using a static management IP address for managed device is usually preferred by network administrators, because static IP address offers a more stable and consistent connectivity to the managed device. To set up a static management IP address of a managed device, a network administrator needs to first connect to the device. A network administrator may connect to the device's console port locally using a network cable. However, when there are hundreds or thousands of managed devices in a network, connecting to each device's console port is physically challenging and time consuming. A network administrator may also remotely connect to the device via data port communications, and configure static IP address manually on the device's management Graphical User Interface (GUI). However, manually configuring thousands of managed devices through their management GUIs is also a time-consuming task and often subject to human errors.

To address the above problems, Network management application 160 comprises auto-configuration module 165. In an example, to automatically configure static management IP addresses of managed devices connected to managed switch 110, network management application 160 first establishes a connection to managed switch 110. Network management application 160 then retrieves a network identifier, such as a Media Access Control (MAC) address, corresponding to the managed device connected to data port 1 of managed switch 110, i.e., managed device 120A.

The retrieved network identifier of managed device 120A may be used to find a matching predetermined management IP address of the device stored in device configuration file 170 and/or device configuration database 180. Other predetermined configuration data of the device, such as device name, or other network parameters, may also be stored in device configuration file 170 and/or device configuration database 180.

The retrieved network identifier of managed device 120A is used to derive a link-local address of the device. A link-local address of the device is derived by translating from the device's network identifier, e.g., a MAC address. Network management application 160 then establishes a second connection to the managed device using the derived link-local address. Network management application 160 then configures the static management IP address to managed device 120A. In some examples, network management application 160 may further establish a third connection with managed device 120A using the newly configured management IP address. In the third connection, network management application 160 may configure other predetermined configuration data of managed device 120A.

Network management application 160 may retrieve a network identifier of a next managed device connected to a data port of managed switch 110 based on the configuration of the first managed device, and configure the static management IP address (or other configuration data) of the next device. Network management application 160 may discover all the managed devices connected to managed switch 110 by repeating the above steps, until each of the connected devices are discovered and configured. Network management application 160 may then move on to the next managed switch in network 100 and repeat the same process to discover and configure all the managed devices in network 100.

It should also be noted that the elements in FIG. 1 and the various functions attributed to each of the elements are described as such for the purposes of ease of understanding. One skilled in the art will appreciate that one or more of the functions ascribed to the various elements (e.g., Network management application 160) may be performed by any one of the other elements, and/or by an element (not shown) configured to perform a combination of the various functions. For example, although not shown, management station 130 may be a part of or integrated into managed switch 110. Therefore, it should be noted that any language directed to managed switch 110, network devices 120A-120N, management station 130 or a DHCP server 150 should be read to include any suitable combination of networking devices, including servers, interfaces, systems, databases, agents, peers, controllers, or other types of networking devices operating individually or collectively to perform the functions ascribed to the various elements.

Figure 2:
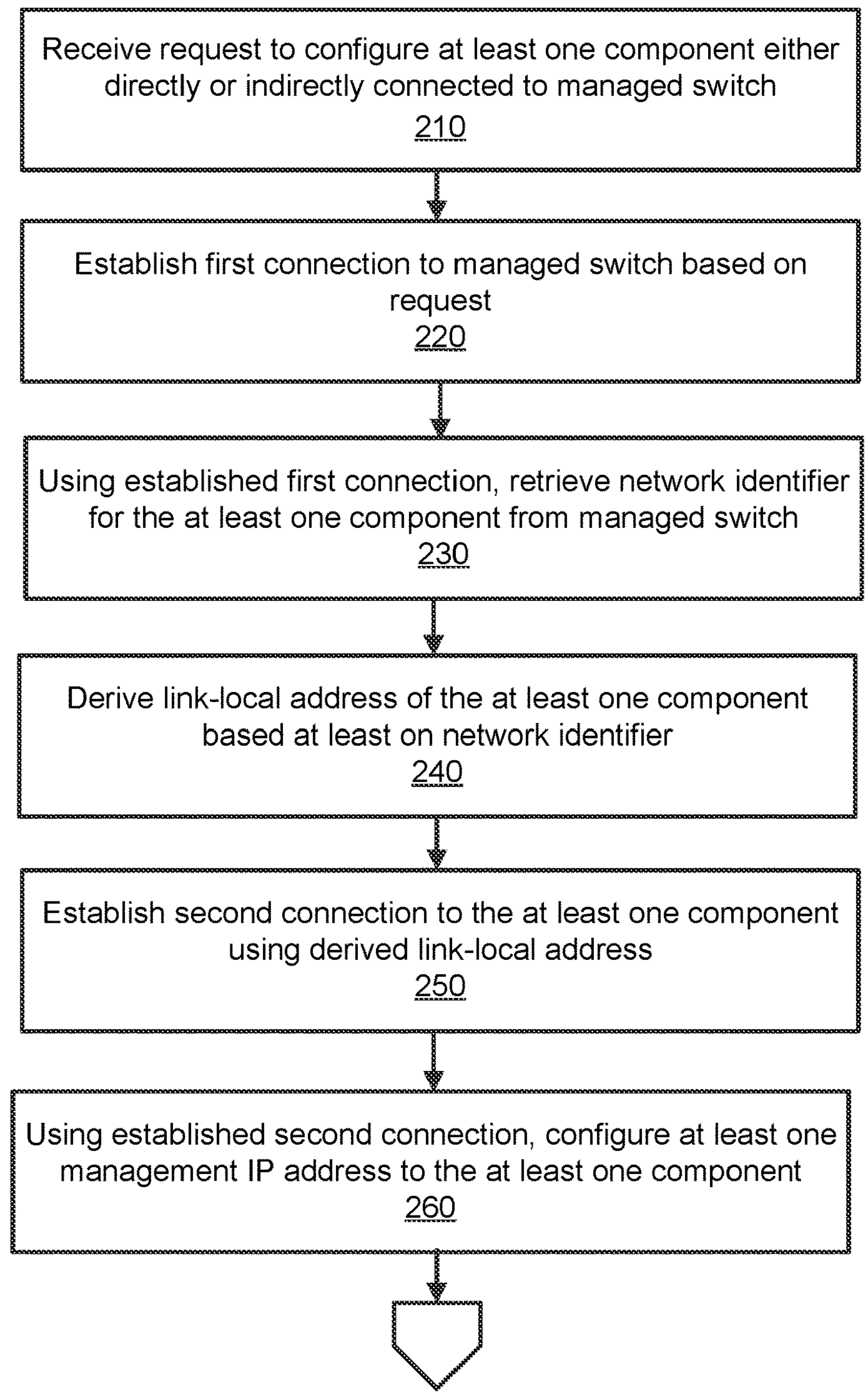
FIG. 2 illustrates a flow diagram for configuring a network device in accordance with an example.

FIG. 2 illustrates a flow diagram for configuring a network device in accordance with an example. The process may be performed by a management station in a network environment. In an example, a managed network device is connected to a managed switch. The management station, the managed switch and the managed device are interconnected via network connections.

At step 210, the management station receives a request to configure a managed network device, which is connected to the managed switch. The request to configure the managed device can be made under many scenarios. The request can be made, for example, when the managed device is first plugged into the network, when the network is rebooted or reconfigured, or during discovery of managed devices in the network, etc. The initiator of the request may be a network administrator issuing command on the management station. The initiator may also be a network management application running in the management station, issuing a request for network discovery or a request to configure managed devices connected to a managed switch. The request should include at least an IP address of the managed switch.

At step 220, the management station establishes a first connection to the managed switch based on the request, using the IP address of the managed switch provided in step 210. The type of connection may be Telnet. A more secure connection such as Secure Shell Protocol (SSH) may be used.

At step 230, after the first connection is established, the management station uses the connection to retrieve a network identifier corresponding to a managed device that is connected to the managed switch. If more than one managed devices are connected to the managed switch, a set of network identifiers may be retrieved, each corresponding to one of the connected managed devices. A network identifier of a device may be a number, a text, or a combination of numbers and texts, etc., that identifies a device on a network. A network identifier may also be an address of the device, such as a Media Access Control (MAC) address, an IP address, or a VLAN ID, etc. Furthermore, a network identifier may also be a model name, model number, or serial number of the device, or version number of the software installed on the device.

A MAC address table of the managed switch may be used to retrieve the MAC address of a managed device connected to the managed switch. In the MAC address table of a switch, network identifiers (such as MAC address) of each device connected to the switch are mapped to the specific port of the switch to which the device is connected. If more than one device or more than one interface is connected to the managed switch, the MAC address of each connected device or interface will be retrieved from the MAC address table.

At step 240, the management station derives a link-local address of the connected managed device based at least on the network identifier of the device retrieved in step 230. A link-local address of a network device is an address that is valid for communications within the branch of the network that the device is connected to. In IPv6, link-local addresses are assigned from address block fe80::/10. A device's MAC address is a binary number of 48 bits (from bit 0 to bit 47). In IPv6, the link-local address of a network device may be derived from the device's MAC address. For example, IPv6 link-local address may be derived by first inverting bit 41 of the MAC address (if the bit is 0, turn it to 1; if the bit is 1, turn it to 0); then inserting hexadecimal numbers "fffe" as infix (between the third and fourth byte of the MAC address) and "fe80" as prefix.

At step 250, the management station establishes a second connection to the managed device using the link-local address of the device derived in step 240. Similar to the first connection, the type of connection may also be Telnet or SSH, or any other client-server connection types.

At step 260, after the second connection is established, the management station uses the connection to configure a management IP address to the managed device. Management IP address may be configured based on predetermined configuration data of each managed device. Predetermined configuration data includes management IP address and other network parameters of the device. The data may be stored in device configuration files and/or device configuration database that are accessible by the network management application in the management station. In the device configuration files or the device configuration database, the predetermined configuration data of each managed device is mapped to one or more network identifiers of the device, e.g., the device's MAC address, serial number, model number, etc.

The management station uses the network identifier retrieved in step 230 to find a matching predetermined configuration data of the device in the configuration file or the configuration database of the management station. If no predetermined configuration data matching the device's network identifier (e.g., MAC address) can be found, matching predetermined configuration data may be found using other network identifiers, such as serial number of the device. In some examples, during the second connection, the management station may issue a command to the device to read the device's serial number. After a matching predetermined configuration data is found, the management station may then configure the predetermined configuration data, which includes management IP address and other network parameters, to the managed device during the second connection.

In some examples, after the device's management IP address is configured during the second connection, the management station may configure the other network parameters of the device using the established connection.

Figure 3:
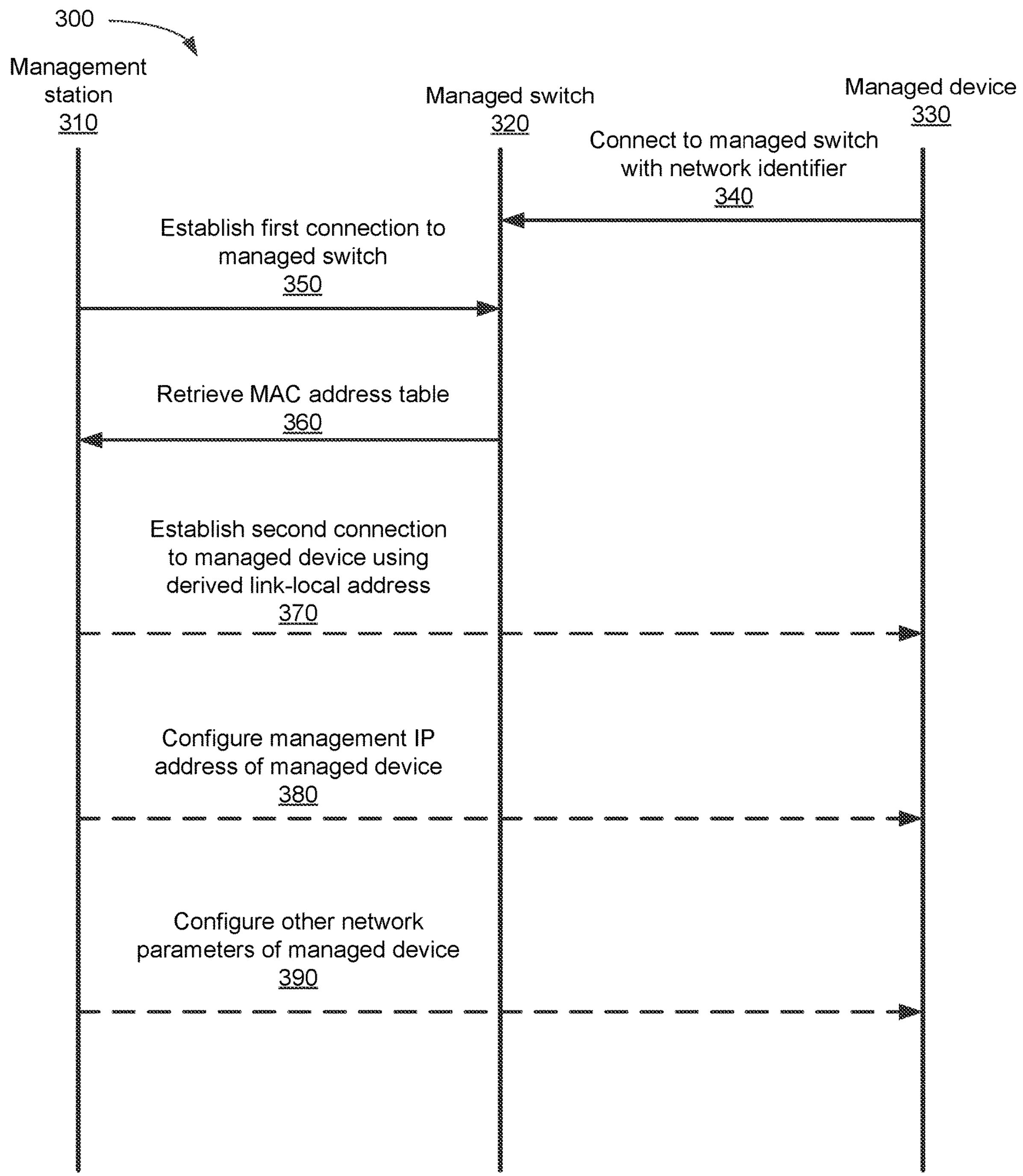
FIG. 3 illustrates a data flow diagram for configuring a network device in accordance with an example.

FIG. 3 illustrates a data flow diagram for configuring a network device in accordance with an example. Diagram 300 illustrates data flows between management station 310, managed switch 320, and managed device 330 in response to a request to configure managed device 330 in a network environment. The request includes at least an IP address of managed switch 320. Management station 310, managed switch 320, and managed device 330 are interconnected via network connections.

At step 340, to automatically configure static management IP addresses of managed device 330 connected to managed switch 320, managed device 330 provides at least one network identifier, e.g., a MAC address, to managed switch 320. For example, managed device 330 may provide the at least one network identifier when managed device 330 is connected (either directly or indirectly) to managed switch 330, during a scheduled update event, or when requested by managed switch 330. In another example, a network management application, e.g., network management application 160, may establish a connection to managed switch 320 and retrieve a network identifier, such as a MAC address, corresponding to managed device 330. At step 350, management station 310 establishes a first connection to managed switch 320 using the IP address of the managed switch provided in the request. At step 360, after the first connection is established between management station 310 and managed switch 320, the management station uses the connection to retrieve a MAC address table of managed switch 320. The MAC address table of managed switch 320 contains at least one network identifier of managed device 330, which is mapped with the managed device 330's static management IP address. Management station 310 then derives a link-local address of managed device 330 based at least on the network identifier of managed device 330 contained in the MAC address table.

At step 370, management station 310 establishes a second connection to managed device 330 using the derived link-local address of managed device 330. At step 380, after the second connection is established between management station 310 and managed device 330, the management station uses the connection to configure a predetermined management IP address to managed device 330. The predetermined configuration of each managed device, including its management IP address and other network parameters, may be stored in device configuration files and/or device configuration database that are accessible by the network management application in the management station.

At step 390, after managed device 330's management IP address is configured using the second connection by management station 310, management station 310 may configure other network parameters of managed device 330 using the established connection.

Figure 4:
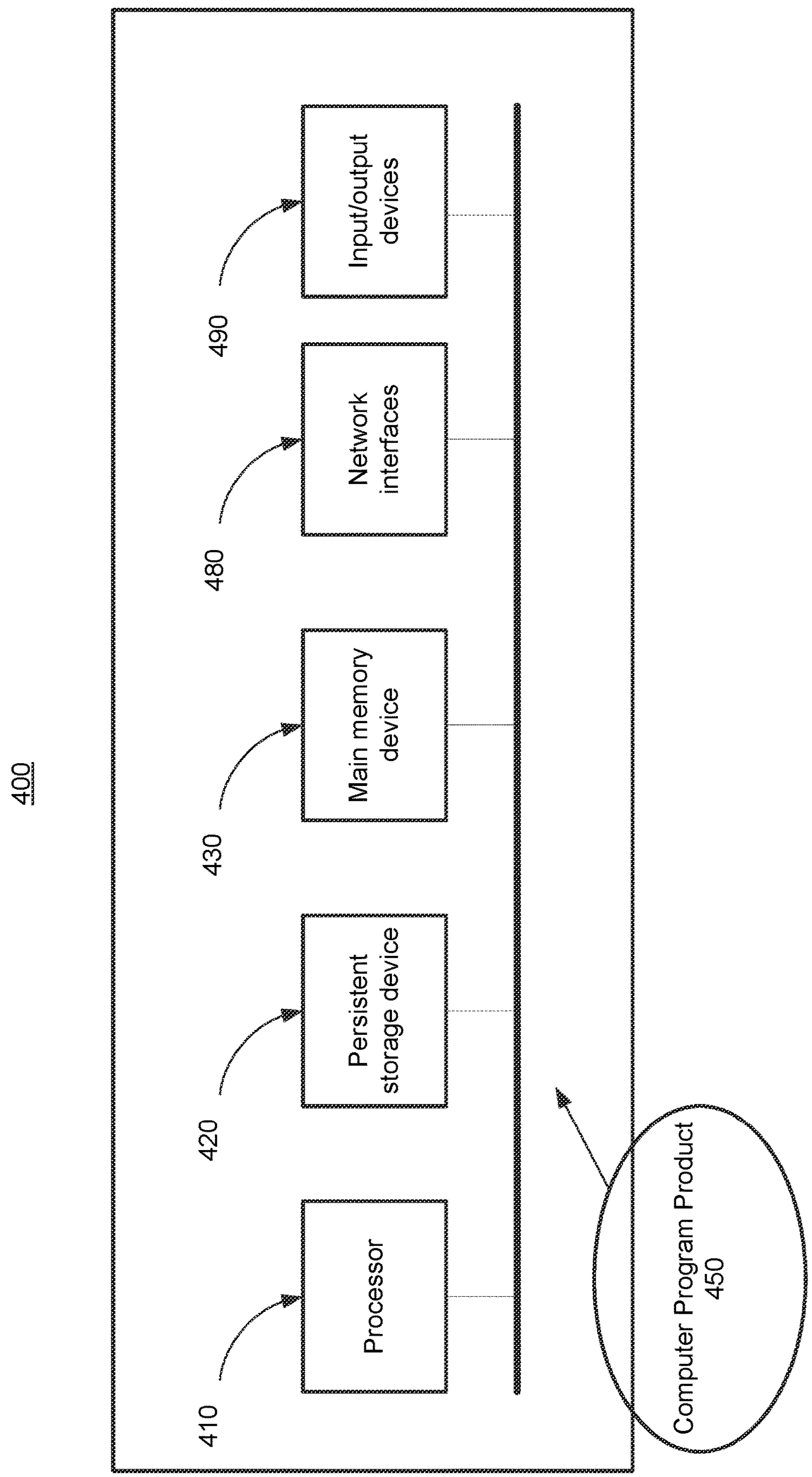
FIG. 4 illustrates a block diagram of a distributed computer system that can be used for implementing one or more aspects of the various examples.

FIG. 4 illustrates a block diagram of a distributed computer system that can be used for implementing one or more aspects of the various examples. Apparatus 400 comprises a processor 410 operatively coupled to a persistent storage device 420 and a main memory device 430. Processor 410 controls the overall operation of apparatus 400 by executing computer program instructions that define such operations. The computer program instructions may be stored in persistent storage device 420, or other computer-readable medium, and loaded into main memory device 430 when execution of the computer program instructions is desired. For example, management station 130, managed switch 110, and the plurality of network devices 120A-120N, may comprise one or more components of apparatus 400. Thus, the various method steps of FIG. 2 herein can be defined by the computer program instructions stored in main memory device 430 and/or persistent storage device 420 and controlled by processor 410 executing the computer program instructions. For example, the computer program instructions can be implemented as computer executable code programmed by one skilled in the art to perform an algorithm defined by the method steps of FIG. 2 herein. Accordingly, by executing the computer program instructions, processor 410 executes an algorithm defined by the method steps herein. Additionally, or alternatively, instructions for implementing the method steps of FIG. 2 herein in accordance with disclosed examples may reside in computer program product 450. When processor 410 is executing the instructions of computer program product 450, the instructions, or a portion thereof, are typically loaded into main memory device 430 from which the instructions are readily accessed by processor 410.

Apparatus 400 also includes one or more network interfaces 480 for communicating with other devices via a network. Apparatus 400 may also include one or more input/output devices 490 that enable user interaction with apparatus 400 (e.g., a display, a keyboard, a mouse, speakers, buttons, etc.).

Processor 410 may include both general and special purpose microprocessors and may be the sole processor or one of multiple processors of apparatus 400. Processor 410 may comprise one or more central processing units (CPUs), and one or more graphics processing units (GPUs), which, for example, may work separately from and/or multi-task with one or more CPUs to accelerate processing. Processor 410, persistent storage device 420, and/or main memory device 430 may include, be supplemented by, or incorporated in, one or more application-specific integrated circuits (ASICs) and/or one or more field programmable gate arrays (FPGAs).

Persistent storage device 420 and main memory device 430 each comprise a tangible non-transitory computer readable storage medium. Persistent storage device 420, and main memory device 430, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 490 may include peripherals. For example, input/output devices 490 may include a display device such as a cathode ray tube (CRT), plasma or liquid crystal display (LCD) monitor for displaying information (e.g., a list of currently connected managed devices in the network with their management IP addresses) to a user, a keyboard, and a pointing device such as a mouse or a trackball by which the user can provide input to apparatus 400.

Any or all of the systems and apparatuses discussed herein, including management station 130, managed switch 110, and the plurality of network devices 120A-120N may be performed by, and/or incorporated in, an apparatus such as apparatus 400.

One skilled in the art will recognize that an implementation of an actual computer or computer system may have other structures and may contain other components as well (e.g., batteries, fans, motherboards, power supplies, etc.), and that FIG. 4 is a high-level representation of some of the components of such a computer for illustrative purposes.

Figure 5:
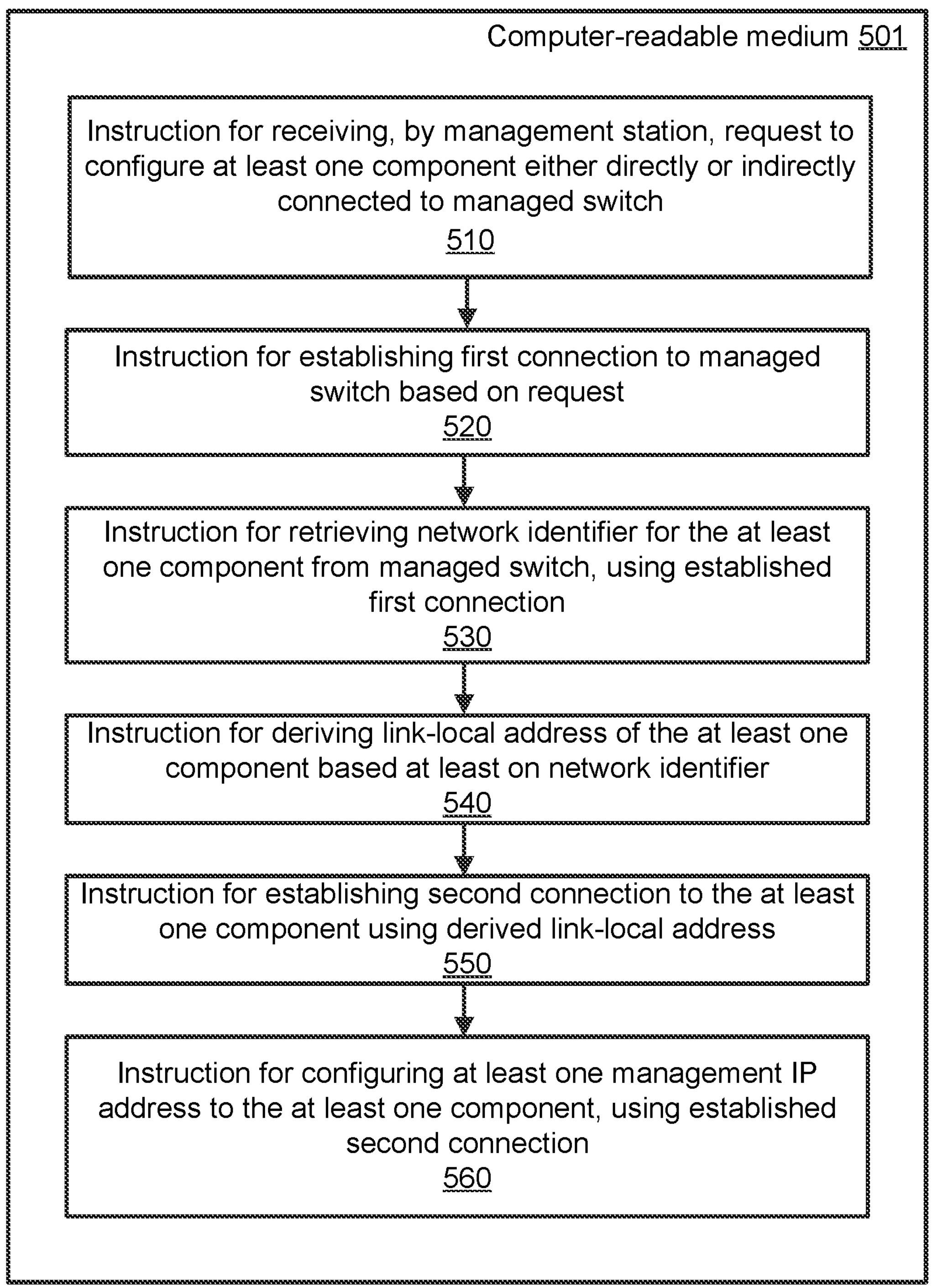
FIG. 5 illustrates a flow chart of steps of a network device configuration function on a computer-readable medium in accordance with an example.

FIG. 5 illustrates a computer-readable medium in accordance with an example. In various examples, the instructions for performing the various methods herein are stored on a non-transitory computer-readable medium, e.g., computer readable medium (CRM) 501. FIG. 5 is shown from the perspective of instructions performed at a management station for automatically connecting and configuring network devices, e.g., in a data center, prior to configuring the network devices with at least one management IP address, or automatically discovering and configuring network devices, within a network environment. For example, CRM 501 may include one or more instructions 510 for receiving, by a management station, a request to configure a managed network device, which is connected to a managed switch. The request to configure a managed device can be made, for example, when the managed device is first plugged into the network, when the network is rebooted or reconfigured, or during discovery of managed devices in the network, etc. The request should include at least an IP address of the managed switch.

Instruction 520 comprises one or more instructions for establishing a first connection to the managed switch based on the request, using the IP address of the managed switch. The type of connection may be Telnet or SSH, or any other client-server connection types. Instruction 530 comprises one or more instructions for retrieving a network identifier for the managed device from the managed switch, using the established first connection. If more than one managed devices are connected to the managed switch, a set of network identifiers may be retrieved, each corresponding to one of the connected managed devices.

CRM 501 may also include one or more instructions 540 for deriving a link-local address of the connected managed device based at least on the retrieved network identifier. Instruction 550 comprises one or more instructions for establishing a second connection to the managed device using the derived link-local address.

Instruction 560 comprises one or more instructions for configuring at least one management IP address to the managed device, using the established second connection. Management IP address of a managed device may be predetermined by the network administrator. The predetermined configuration of each managed device, including its management IP address and other network parameters, may be stored in device configuration files and/or device configuration database that are accessible by the network management application in the management station.

The various examples are described herein with reference to the accompanying drawings, which form a part hereof, and which show, by way of illustration, specific ways of practicing the examples. This specification may, however, be construed in many different forms and should not be construed as being limited to the examples set forth herein; rather, these examples are provided so that this specification will be thorough and complete, and will fully convey the scope of the examples to those skilled in the art. Among other things, this specification may be implemented as methods or devices. Accordingly, any of the various examples herein may take the form of an entirely hardware example, an entirely software example or an example combining software and hardware aspects. The specification is, therefore, not to be taken in a limiting sense.

Throughout the specification and claims, the following terms take the meanings explicitly associated herein, unless the context clearly dictates otherwise:

The phrase "in an example" as used herein does not necessarily refer to the same example, though it may. Thus, as described above, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the above discussion, numerous references have been made regarding servers, services, interfaces, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be realized as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be realized as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative, but not restrictive, and the scope of the examples disclosed herein is not to be determined from the specification, but rather from the claims as interpreted according to the full breadth permitted by the patent laws. It is to be understood that the examples shown and described herein are illustrative of the principles of the present disclosure and that various modifications may be implemented by those skilled in the art without departing from the scope and spirit of the disclosure. Those skilled in the art could implement various other feature combinations without departing from the scope and spirit of the disclosure.

It should also be appreciated that the foregoing specification is not intended as an extensive overview, and as such, concepts may be simplified in the interests of clarity and brevity. In the disclosure herein, network "device" and network "component" are used interchangeably. Moreover, "network" may refer to a Local Area Network (LAN), a Wide Area Network (WAN), or network within a data center. A network switch is a device in a computer network that connects other network devices together. A network device, which includes a switch, can be either unmanaged or managed. An unmanaged switch has no configuration interface or options. It simply connects to other network devices with a fixed configuration. An unmanaged switch is often used in a small office/home office environment or is used to add components temporarily to a larger network. A managed switch, on the other hand, allows users to manage, configure and monitor the operation of the switch and the network devices connected to the switch. Similarly, a network device can also be either unmanaged or managed.

The invention claimed is:

1. A system comprising:

a management station;

a managed switch; and at least one memory having computer-readable instructions stored thereon which, when executed by at least one processor coupled to the at least one memory, cause the at least one processor to:

receive, by the management station, a request to configure at least one component in a network, wherein the at least one component is connected to the managed switch;

establish, by the management station, a first connection to the managed switch based on the request;

using the established first connection, retrieve a network identifier for the at least one component from the managed switch;

derive, by the management station, a link-local address of the at least one component based at least on the network identifier;

establish, by the management station, a second connection to the at least one component using the derived link-local address; and using the established second connection, configure, by the management station, at least one management IP address to the at least one component, wherein the at least one management IP address is operable for addressing the at least one component within the network.

2. The system of claim 1, wherein at least one of the first connection or second connection is established via a Secure Shell Protocol (SSH).

3. The system of claim 1, wherein the managed switch comprises an Out-of-Band Management (OOBM) switch.

4. The system of claim 1, wherein the network identifier is a Media Access Control (MAC) address, and wherein deriving the link-local address of the at least one component further comprises causing the at least one processor to:

obtain the MAC address for the at least one component from the managed switch; and determine the link-local address of the at least one component by translating the MAC address.

5. The system of claim 4, wherein the at least one processor is further caused to translate the MAC address based on a MAC address table comprising network identifiers for each of a plurality of components.

6. The system of claim 1, wherein the link-local address is an IPv6 link-local address.

7. The system of claim 1, wherein the network identifier for the at least one component comprises at least one of: a model name, a model number, a serial number, an address, or a software version number.

8. The system of claim 1, wherein the management IP address of the at least one component is configured based on configuration data for the at least one component.

9. The system of claim 1, wherein the management station is located at a data center, and wherein the at least one component comprises at least one of: a router, a switch, a hub, a bridge, a gateway, a repeater, a server, a firewall, a controller, or a virtual component.

10. A computerized method comprising:

receiving, by a management station, a request to add at least one component to a network, wherein the at least one component is connected to a managed switch;

establishing, by the management station, a first connection to the managed switch based on the request;

using the established first connection, retrieving a network-identifier address for the at least one component from the managed switch;

deriving, by the management station, a link-local address of the at least one component based at least on the network identifier;

establishing, by the management station, a second connection to the at least one component using the derived link-local address; and using the established second connection, configuring, by the management station, at least one management IP address to the at least one component, wherein the at least one management IP address is operable for addressing the at least one component within the network.

11. The method of claim 10, wherein at least one of the first connection or second connection is established via a Secure Shell Protocol (SSH).

12. The method of claim 10, wherein the managed switch comprises a Network Out-of-Band Management (OOBM) switch.

13. The method of claim 10, wherein the network-identifier address is a Media Access Control (MAC) address, and wherein deriving the link-local address of the at least one component further comprises:

obtaining the MAC address for the at least one component from the managed switch; and determining the link-local address of the at least one component by translating the MAC address.

14. The method of claim 13, further comprising translating the MAC address based on a MAC address table comprising network identifiers for each of a plurality of components.

15. The method of claim 10, wherein the link-local address is an IPv6 link-local address.

16. The method of claim 10, wherein the management IP address of the component is configured based on configuration data for the at least one component.

17. The method of claim 10, wherein the network comprises a data center, and wherein the at least one component comprises at least one of: a router, a switch, a hub, a bridge, a gateway, a repeater, a server, a firewall, a controller, or a virtual component.

18. A computer program product having computer-readable instructions stored thereon, which, when executed by at least one processor, cause the at least one processor to perform one or more steps comprising:

receiving, by the management station, a request to add at least one component to a network, wherein the at least one component is connected to a managed switch;

establishing, by the management station, a first connection to the managed switch based on the request;

using the established first connection, retrieving a network identifier for the at least one component from the managed switch;

deriving, by the management station, a link-local address of the at least one component based at least on the network identifier;

establishing, by the management station, a second connection to the at least one component using the derived link-local address; and using the established second connection, configuring, by the management station, at least one management IP address to the at least one component, wherein the at least one management IP address is operable for addressing the at least one component within the network.

19. The computer program product of claim 18, wherein at least one of the first connection or second connection is established via a Secure Shell Protocol (SSH).

20. The computer program product of claim 18, wherein the network identifier is a Media Access Control (MAC) address, and wherein deriving the link-local address of the at least one component further comprises causing the at least one processor to perform one or more steps comprising:

obtaining the MAC address for the at least one component from the managed switch; and determining a link-local address of the at least one component by translating the MAC address for the at least one component using a MAC address table.

* * * * *